United States Patent
Lincoln et al.

(10) Patent No.: US 8,416,873 B2
(45) Date of Patent: Apr. 9, 2013

(54) MMSE DEMODULATION IN A MULTI-USER MIMO SYSTEM

(75) Inventors: Bo Lincoln, Lund (SE); Fredrik Nordström, Lund (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 1025 days.

(21) Appl. No.: 12/400,234

(22) Filed: Mar. 9, 2009

(65) Prior Publication Data

US 2010/0128827 A1 May 27, 2010

Related U.S. Application Data

(60) Provisional application No. 61/118,165, filed on Nov. 26, 2008.

(51) Int. Cl.
*H04B 7/02* (2006.01)
(52) U.S. Cl. ........ 375/267; 375/260; 375/299; 375/346; 375/347; 375/349
(58) Field of Classification Search .................. 375/267, 375/260, 299, 346, 347, 349
See application file for complete search history.

(56) References Cited

U.S. PATENT DOCUMENTS

| 2008/0130790 A1* | 6/2008 | Forenza et al. ............... 375/299 |
| 2008/0225960 A1 | 9/2008 | Kotecha et al. |
| 2009/0219838 A1* | 9/2009 | Jia et al. ........................ 370/278 |

FOREIGN PATENT DOCUMENTS

| WO | 2008/115650 A1 | 9/2008 |
| WO | WO2008132689 | 11/2008 |

OTHER PUBLICATIONS

D. Gesbert, et al., "Multiple antenna techniques," Chapter in book "UMTS Long Term Evolution: From Theory to Practice," J. Wiley, (to appear). Downloaded from http://www.eurecom.fr/~gesbert/papers/MIMO_LTE.pdf, 53 pages.

* cited by examiner

*Primary Examiner* — Kabir A Timory
(74) *Attorney, Agent, or Firm* — Coats & Bennett, P.L.L.C.

(57) ABSTRACT

A method and apparatus is provided for demodulating a desired data stream in a MU-MIMO communication system where only the precoder for the desired data stream is known a priori. The receiving terminal according to various embodiments of the present invention estimates the precoder for one or more interfering data streams. The receiving terminal can then use the known precoder for the desired data stream and the estimated precoders for the interfering data streams to perform MMSE demodulation.

22 Claims, 6 Drawing Sheets

MMSE DEMODULATION IN A MULTI-USER MIMO SYSTEM

RELATED APPLICATION

This application claims the benefit of U.S. Provisional Patent Application 61/118,165 filed Nov. 26, 2008, which is incorporated herein by reference.

BACKGROUND

The present invention relates generally to spatial multiplexing in a multi-user multiple-input, multiple output (MU-MIMO) communication system and, more particularly, to a methods and apparatus for demodulating received signals in a MU-MIMO communication system.

In recent years, there has been much interest in multiple input, multiple output (MIMO) systems for enhancing data rates in mobile communication systems. MIMO systems employ multiple antennas at the transmitter and receiver to transmit and receive information. By exploiting the spatial dimension of the communication channel between the transmitting terminal and the receiving terminal, MIMO communication systems can simultaneously transmit multiple data streams from a transmitting terminal to one or more receiving terminals over the same carrier frequency. Thus, MIMO communication systems achieve higher spectral efficiency and higher data rates without increasing bandwidth.

One transmission scheme for MIMO systems that is receiving significant attention is spatial multiplexing. In a spatial multiplexing transmitter, several independently encoded data streams are precoded and transmitted with appropriate weighting from each one of the transmit antennas with appropriate weighting so that the link throughput is maximized. The Long Term Evolution (LTE) standard supports several spatial multiplexing modes, including one for multi-user MIMO (MU-MIMO). In this mode, multiple data streams are transmitted by the transmitting terminal to different receiving terminals. Thus, from the perspective of a given receiving terminal, there will be at least one data stream, referred to as the desired data stream, intended for that receiving terminal and one or more other data streams, referred to herein as interfering data streams, intended for other receiving terminals.

Typically, the set of precoding weights, i.e. precoder, for the desired data stream is signaled to the receiving terminal so that it will know the effective channel associated with the desired data stream. However, the precoders for the interfering data streams may not be signaled, so the receiving terminal typically employs Maximum Ratio Combining (MRC) to demodulate the received signal. Because the interference attributable to the data streams intended for other user terminals is correlated, MRC combining is suboptimal.

SUMMARY

The present invention relates to a method and apparatus for demodulating a desired data stream in a MU-MIMO communication system where only the precoder for the desired data stream is known a priori. The receiving terminal according to various embodiments of the present invention estimates the precoder for one or more interfering data streams. The receiving terminal can then use the known precoder for the desired data stream and the estimated precoders for the interfering data streams to perform MMSE demodulation.

One exemplary embodiment of the present invention comprises a method of demodulating a received signal in a MU-MIMO communication system where different data streams are transmitted to different receiving terminals. The receiving terminal receives a signal transmitted from a transmitter having two or more transmit antennas. The received signal contains a desired data stream precoded with a known precoder and interference attributable to at least one interfering data stream precoded with an unknown precoder. The receiving terminal estimates the precoder for the interfering data stream and then demodulates the desired data stream using the known precoder for the desired data stream along with the estimated precoder for the interfering data stream to reduce said interference and to obtain demodulation symbols corresponding to the desired data stream.

Another exemplary embodiment of the present invention comprises a receiving terminal for a MU-MIMO communication system, In one embodiment, the receiver comprises a plurality of receivers coupled to respective receive antennas to receive signal transmitted from a transmitter having two or more transmit antennas. The received signal contains a desired data stream pre-coded with a known precoder and interference attributable to at least one interfering data stream pre-coded with an unknown precoder. The receiving terminal further comprises a processor for demodulating the desired data stream. The processor comprises an estimator to estimate the precoder for the interfering data stream, and a demodulator to demodulate the desired data stream using the known precoder of the desired data stream and the estimated precoder for the interfering data stream to reduce said interference and to obtain demodulation symbols corresponding to said desired data stream.

DETAILED DESCRIPTION

Figure 1:
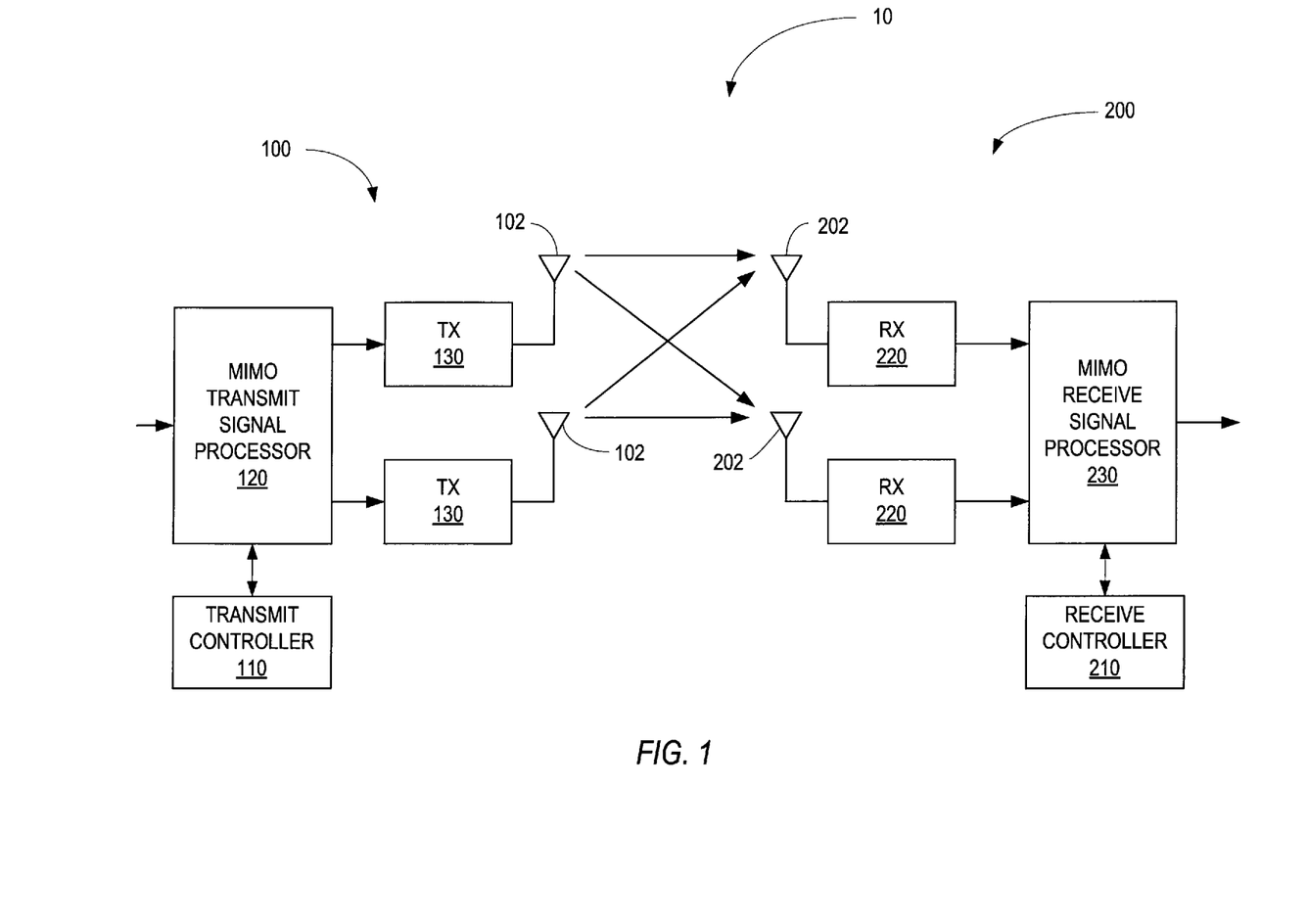
FIG. 1 illustrates an exemplary multiple-input, multiple output (MIMO) communication system.

Referring now to the drawings, FIG. 1 illustrates an exemplary multiple input, multiple output (MIMO) communication system indicated generally by the numeral 10. The MIMO communication system 10 may comprise, for example, a wireless communication network such as a Long Term Evolution (LTE) network or WIMAX network. The MIMO communication system includes a transmitting terminal 100 having a plurality of transmit antennas 102 and a receiving terminal 200 having a plurality of receive antennas 202. The transmitting terminal 100 is configured to simultaneously transmit multiple parallel streams over the same carrier frequency to one or more receiving terminals 200. The receiving terminal 200 can exploit the spatial dimensions of the signal to separate the signals. MIMO systems are thus able to achieve higher spectral efficiency and higher data rates without increasing bandwidth.

While the transmitting terminal 100 and receiving terminal 200 are shown as separate terminals in FIG. 1, it should be appreciated that a communication terminal in the wireless communication network can comprise both a transmitting terminal 100 and a receiving terminal 200. For example, a base station in a wireless communication network may serve as a transmitting terminal 100 for downlink communications with a mobile terminal (the receiving terminal) and a receiving terminal 200 for uplink communications with the mobile terminal (the transmitting terminal). Conversely, a mobile terminal in the wireless communication network may serve a receiving terminal 200 for downlink communications with the base station (the transmitting terminal) and a transmitting terminal for uplink communications with the base station (the receiving terminal).

Referring back to FIG. 1, the transmitting terminal 100 comprises a transmit controller 110, a transmit signal processor 120, and a plurality of transmitters 130 coupled to respective transmit antennas 102. The transmit controller 110 controls the overall operation of the transmitting terminal 100. The transmit signal processor 120 processes the information signals to be transmitted and generates the transmit signals transmitted by each transmit antenna 102. The transmit controller 110 and transmit signal processor 120 may be implemented by one or more processors, microcontroller, hardware, or a combination thereof. The transmit signals generated by the transmit signal processor 120 are supplied to respective transmitters 130. The transmitters 130 include radio frequency components to upconvert, filter, and amplify the signals transmitted by the transmit antennas 102.

The receiving terminal 200 comprises a receive controller 210, a plurality of receivers 220, and a receive signal processor 230. The receive controller 210 controls the overall operation of the receiving terminal 200. The receivers 220 are coupled to respective receive antennas 202 and comprises radio frequency components to filter, amplify, and downconvert the received signal for processing by the receive signal processor 230. The receive signal processor 230 processes the signals received by each receive antenna 202. As will be described in more detail below, the receive signal processing typically includes demodulation and decoding of the received signals. The receive controller 210 and receive signal processor 230 may be implemented in one or more processors, microcontrollers, hardware, of a combination thereof.

In the exemplary MIMO communication system 10, the transmitting terminal 100 and receiving terminal 200 are configured to implement a transmission technique known as spatial multiplexing. Spatial multiplexing may be viewed as a generalized form of beamforming. With spatial multiplexing, multiple data streams are precoded and transmitted by each transmit antennas 102 with independent and appropriate weighting per each antenna such that the link throughput is maximized at the receiver output.

Figure 2:
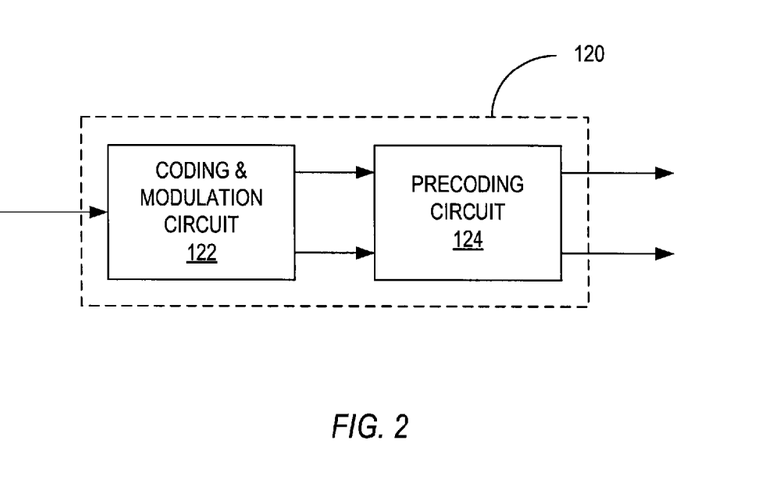
FIG. 2 illustrates an exemplary transmit signal processor for a MIMO communication system.

FIG. 2 illustrates an exemplary transmit signal processor 120 for a transmitting terminal 100 that implements spatial multiplexing. The transmit signal processor 120 comprises a coding and modulation circuit 122, and a precoding circuit 124. In single user (SU) MIMO systems, an information signal for a single receiving terminal 200 is input to the coding and modulation circuit 122. The coding and modulation circuit 122 divides the information signal into two or more data streams that are separately coded and modulated. In multi-user (MU) MIMO systems, information signals for two or more different users may be input to the coding and modulation circuit 122. In both cases, multiple data streams are output by the decoding and modulation circuit 122. In the exemplary embodiment, the data streams output from the decoding and modulation circuits 122 are input to a precoding circuit 124. The precoding circuit 124 precodes the symbol streams and generates transmit signals for each transmit antenna 102 to implement spatial multiplexing as known in the art.

The LTE standard supports several spatial multiplexing modes including one for for MU-MIMO. In this mode, multiple data streams are transmitted by the transmitting terminal 100 to different receiving terminals 200. Thus, from the perspective of a given receiving terminal 100, there will be one data stream intended for that receiving terminal 200 and one or more data streams intended for other receiving terminals. The data stream intended for a particular receiving terminal 200 is referred to as a desired data stream. The data streams intended for the other receiving terminals 200 interfere with the desired data stream and are thus referred to herein as interfering data streams.

The LTE standard specifies the precoding weights for 1-4 layers and 1-4 transmit antennas 102. In each case, the number of transmit antennas 102 and the number of receive antennas 202 are greater than or equal to the number of layers. The actual number of receive antennas 202 is not defined by the standard and can be greater than the number of layers. The antenna configuration of the MIMO system may be indicated by the notation n×m, where n indicates the number of transmit antennas 102 and m indicates the number of receive antennas 202. For example, a 2×2 MIMO system refers to a transmitter with two transmit antennas 102 and a receiver with two receive antennas 202. It is implicit that the number of layers is equal to or less than min(n,m).

In the case of multi-user MIMO, where the data streams are intended for different receiving terminals 200, the transmitting terminal 100 signals the precoding weights for the desired data stream to each receiving terminal 100. However, the receiving terminals 200 do not know the precoding weights applied to the data streams intended for other receiving terminals 200. Because the structure of the interference attributable to the interfering data streams is not known, maximum ratio combining (MRC) demodulation is typically used to combine the signals received by each receive antenna 202. MRC demodulation may be given by:

$$u = ((HW)^H(HW))^{-1}(HW)^H r \qquad \text{Eq. 1}$$

where H is the channel between the transmit antennas 102 and the receive antennas 202, W is the set of precoding weights (i.e., precoder) applied to the desired data stream, r is a vector of the received symbol received at each receive antenna 202, and u is the estimated symbol. In a 2×2 MIMO system, H is a 2×2 matrix, W is a 2×1 vector, and r is a 2×1 vector. For convenience, the set of precoding weights applied to a particular data stream by the precoding circuit 124 is referred to herein as a precoder.

In multi-user MIMO systems, the receiving terminals 200 typically demodulate only the desired stream. MRC demodulation works well when the interference attributable to the interfering data streams is uncorrelated. However, when the interference contributed by the interfering data streams is correlated, MRC demodulation is sub-optimal.

Figure 3:
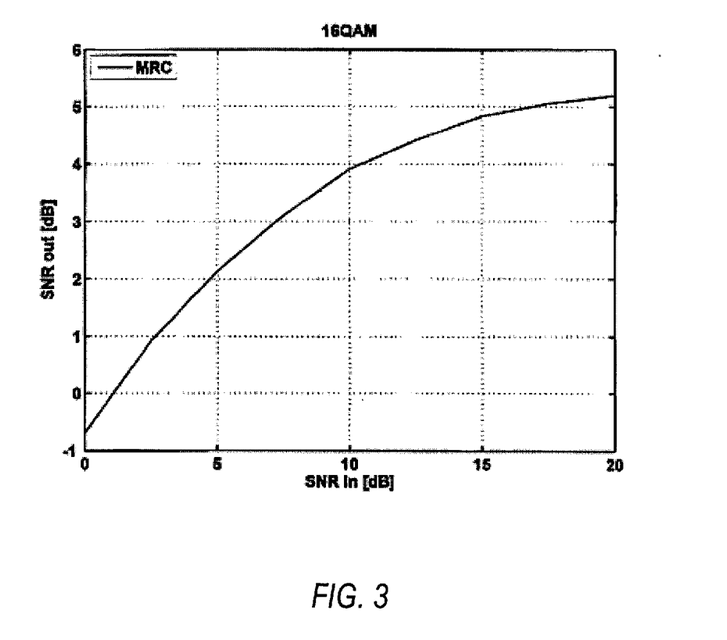
FIG. 3 illustrates the effective SNR of a receiver in the MIMO communication system using Maximum Ratio Combining (MRC) for demodulating a received signal.

FIG. 3 is a graph illustrating the effective SNR that can be obtained in a 2×2 multi-user MIMO system using MRC demodulation. In this example, the precoding weights for the two data streams are assumed to be different and chosen randomly. As shown in FIG. 3, there is a large loss of performance, particularly at high signal-to-noise ratios.

According to the various embodiments of the present invention, Minimum Mean Squared Error (MMSE) demodulation is used to improve the receiver performance in a MU-MIMO communication system 10. MMSE demodulation requires knowledge of the precoding weights applied to the interfering data streams, as well as the desired data stream. MMSE demodulation may be given by:

$$u=((HW)^H(HW)+R)^{-1}(HW)^H r \qquad \text{Eq. 2}$$

where R is the covariance of the noise represented as a 2×2 matrix. In the 2×2 MIMO system, $W=[w_1, w_2]$ is a 2×2 matrix of the precoding weights applied to the desired data stream and the interfering data stream. The first row of W, denoted by $w_1$ comprises the set of precoding weights applied to the desired data stream and the second row of W, denoted as $w_2$, is the set of precoding weights applied to the interfering data stream.

As noted above, the transmitting terminal 100 typically indicates the precoder for the desired data stream, but does not indicate the precoder used for the interfering data streams. The precoder may be indicated by transmitting an index that is associated with the precoder. Therefore, the receiving terminal 200 according to the present invention estimates the precoder for the interfering data streams. The receiving terminal 200 can then use the known precoder for the desired data stream and the estimated precoder for the interfering data streams to perform MMSE demodulation.

Figure 4:
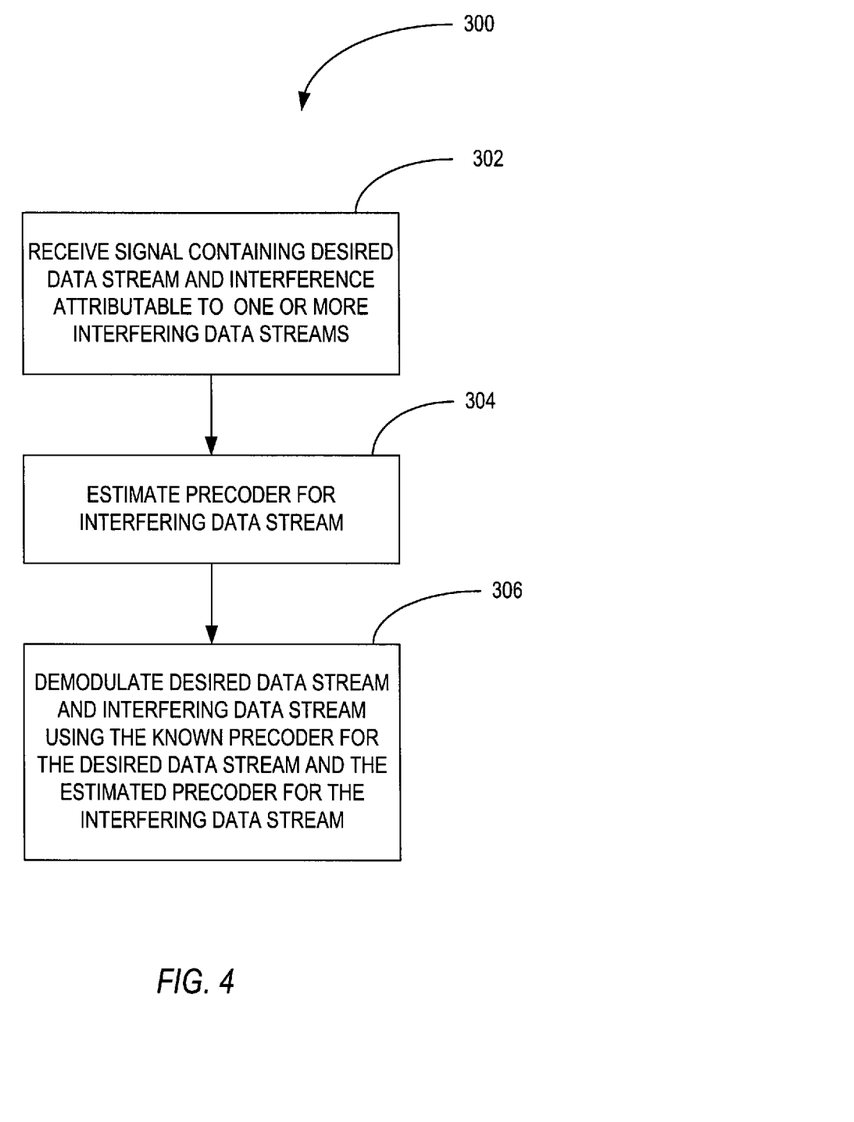
FIG. 4 illustrates an exemplary method of estimating the precoder for one or more interfering data streams in a multi-user MIMO communication system.

FIG. 4 illustrates an exemplary method 300 implemented by the receiving terminal according to one embodiment of the invention. The receiving terminal 200 receives a signal at each receive antenna 202 containing a desired data stream and interference attributable to one or more interfering data streams (block 302). The receiving terminal 200 estimates the precoder (i.e., set of precoding weights) for each interfering data stream (block 304). Various techniques for estimating the precoders for the interfering data streams are described below. The receiving terminal 200 can then demodulate the desired data stream and interfering data stream using the known precoder for the desired data stream and the estimated precoders for the interfering data streams (block 306). MMSE demodulation is preferably used to demodulate the desired data stream. The demodulated symbols for the desired data stream can then be passed to a decoder for decoding. The demodulated symbols for the interfering data streams can be discarded.

In order to be able to estimate the precoder for an interfering data stream, it is assumed that the precoders are kept constant over a certain range of data symbols. In LTE systems, resource blocks (RBs) are allocated in pairs. One resource block comprises 12 subcarriers×0.5 milliseconds period. One RB pair comprises 12 subcarriers×1.0 milliseconds, which is about 150 symbols. In practical implementations, the precoding weights are changed at most every 4 resource block pairs.

Figure 5:
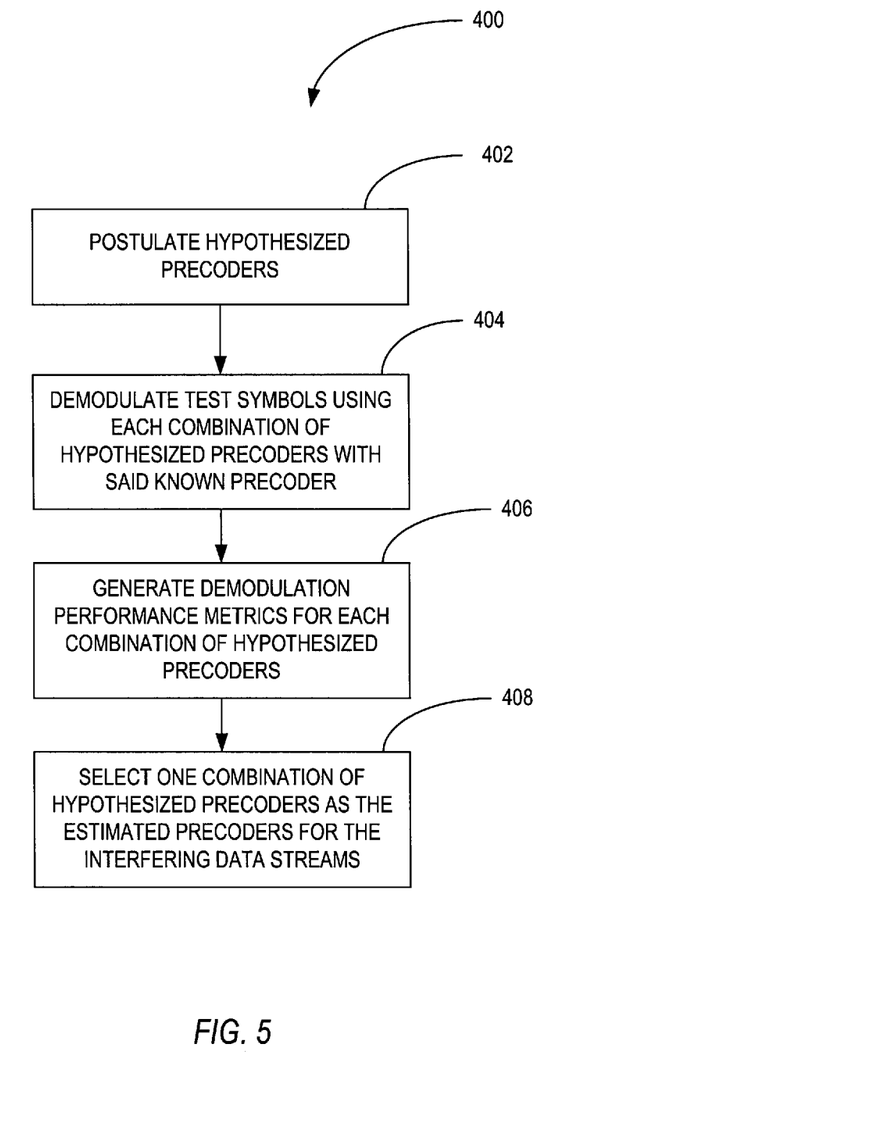
FIG. 5 is an exemplary method implemented by a MIMO receiver for demodulating a received signal.

FIG. 5 illustrates an exemplary method 400 for estimating the precoding weights for the interfering data streams, which may be implemented at block 304 of FIG. 4. First, a set of hypothesized precoders for each interfering data streams are postulated (block 402). Each possible combination of hypothesized precoders is tested by demodulating N test symbols over a predetermined window using the known precoding weights for the desired data stream and the hypothesized precoders for the interfering data streams (block 404). In some embodiments, less than all possible combination may be tested. In the MU-MIMO case using two transmitting antennas, there is only 1 interfering data stream and thus only one set of hypothesized precoders. A demodulation performance metric is then computed for each combination of hypothesized precoders (block 406). Several different demodulation performance metrics are contemplated. In each case, the demodulation performance metric provides a measure of the residual interference following demodulation. The set of hypothesized precoders that minimizes the residual interference is then selected as the estimated precoding weights (block 408). The estimated precoding weights are then used in the demodulation of the desired data stream and interfering data streams in block 306 of FIG. 4.

In one exemplary embodiment, the demodulation performance metric comprises the average interference over N demodulated test symbols. A soft value is generated for each demodulated test symbol. A hard decision is then made to convert the soft value into a hard value. The difference between the hard value and soft value is used as an estimate of the interference. An average of the interference estimates over N test symbols is then computed and used as a demodulation performance metric.

In another exemplary embodiment, the demodulation performance metric comprises a signal plus noise metric for the N demodulated test symbols. In this case, the hypothesized set of precoding weights that results in the lowest signal plus noise metric is selected as the estimated precoding weights for the interfering data streams.

The estimation of the precoding weights for the interfering data streams is aided by the fact that the LTE standard specifies a limited number of precoders. Please note that in this context, the term "precoder" refers to the set of precoding weights that are applied to a given data stream. When the transmitting terminal 100 has two transmit antennas, there are four possible precoders from which to choose. When the transmitting terminal has four transmit antennas 102, there are sixteen possible precoders from which to choose. In some embodiments of the invention, it may be assumed that the precoder used for the interfering data streams are not the same as the precoder used for the desired data stream.

In some embodiments of the invention, the demodulator performance metrics may be weighted to bias the selection of the estimated precoders for the interfering data streams. For example, when selecting precoders for multiple data streams, the transmitting terminal 100 will typically prefer to use orthogonal precoders for the different data streams. Further, the transmitting terminal 100 is unlikely to select the same precoder for two different data streams. Therefore, the computation of the demodulator performance metrics for the hypothesized precoders may down-weight the hypothesized precoders that are the same as the precoder for the desired data stream, and up-weight the precoders that are orthogonal to the desired data stream. The demodulator performance metrics can be weighted by applying a predetermined scaling factor to the computed demodulated performance metric to either increase or decrease the demodulator performance metric. By weighting the demodulator performance metrics, the precoder estimator at the receiving terminal will be biased in favor of hypothesized precoders orthogonal to the precoder for the desired data stream and disfavor hypothesized precoders that are the same as the precoder for the desired data stream.

In some instances, the receiving terminal 200 may have some knowledge of the precoders used for an interfering data stream in previous time or frequency interval. As noted above, the transmitting terminal 100 may be configured to use the same precoder for a specified period of time, e.g., every four resource block pairs. Therefore, if the receiving terminal 200 has information about a precoder used for an interfering data stream in a previous time or frequency interval, it can bias the selection of an estimated precoder for a current time interval by up-weighting the demodulator performance metric for those hypothesized precoders that were used in a previous time or frequency interval.

Figure 6:
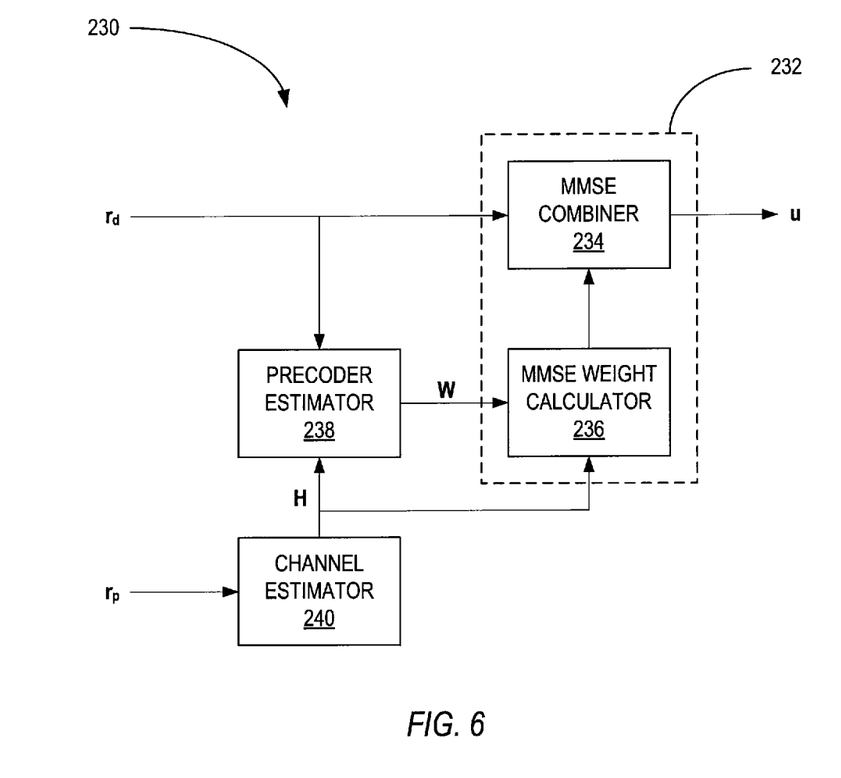
FIG. 6 illustrates an exemplary MIMO receiver according to one exemplary embodiment using Minimum Mean Squared Error (MMSE) combining for demodulation.

FIG. 6 illustrates an exemplary receive signal processor 230 according to one exemplary embodiment of the invention that performs MMSE demodulation using estimated precoders for the interfering data streams. The receive signal processor 230 comprises an MMSE demodulation unit 232, a precoder estimator 238, and a channel estimator 240. The MMSE demodulation unit 232 uses MMSE combining to demodulate the desired data stream and interfering data streams. The MMSE demodulation unit 232 comprises an MMSE combiner 234 and an MMSE weight calculator 236. The MMSE combiner 234 combines the signals received at multiple receive antennas 202 using combining weights provided by the MMSE weight calculator 236. The MMSE weight calculator 236 computes the combining weights in a known manner based on the precoder estimate W provided by the precoder estimator 238. The precoder estimator 238 estimates the precoder for the interfering data streams as described above and shown in FIG. 5. The channel estimator 240 generates a channel estimate H in a known manner based on receiving a pilot signal from the transmitting terminal 100.

Figure 7:
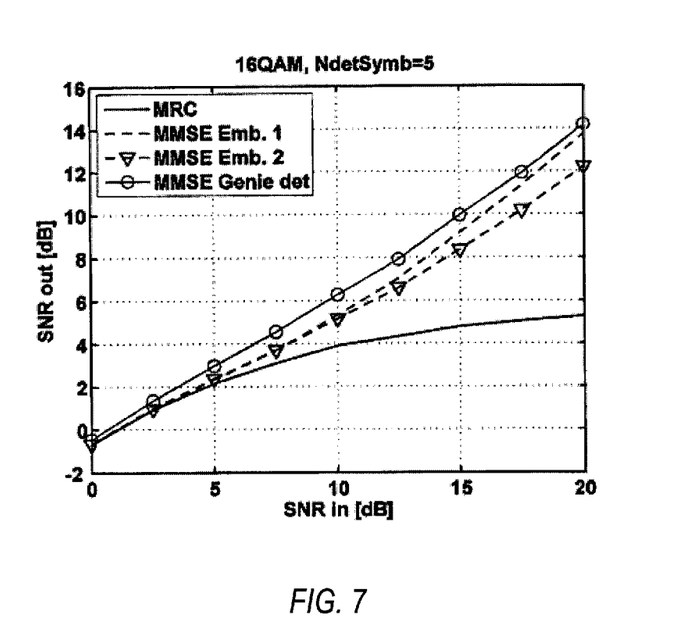
FIG. 7 illustrates the effective SNR of a receiver in the MIMO communication system using MMSE combining for demodulating a received signal in the case where the precoder for the interfering data stream is randomly chosen.

FIG. 7 illustrates the effective SNR of a receiving terminal 200 in the MIMO communication system 10 using MMSE combining in the case where the precoder for the interfering data stream is assumed to be different from the precoder for the desired data stream and is randomly chosen. It is further assumed that 16 QAM modulation is used and that the testing of the hypothesized precoders is performed over five test symbols. As shown in FIG. 7, there is a significant increase in the signal-to-noise ratio at the output of the demodulator as compared to MRC demodulation.

Figure 8:
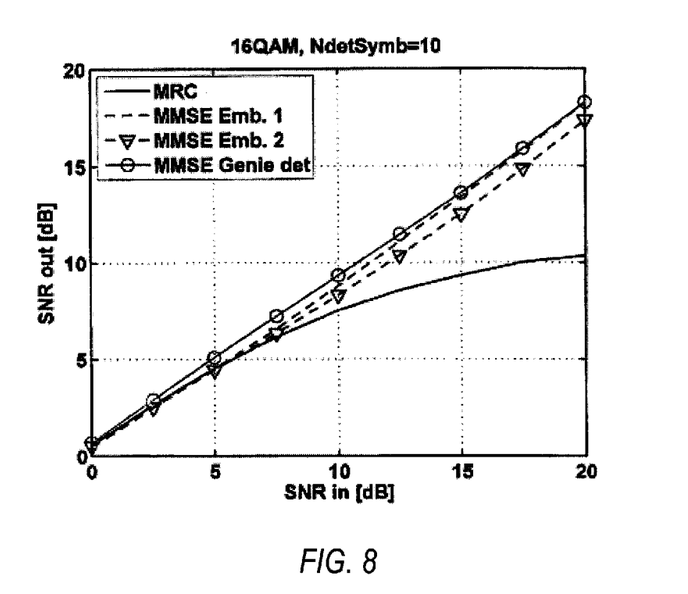
FIG. 8 illustrates the effective SNR of a receiver in the MIMO communication system using MMSE combining for demodulating a received signal in the case where the precoder for the interfering data stream is orthogonal to the precoder for the desired data stream.

FIG. 8 illustrates the effective SNR of a receiving terminal 200 in the MIMO communication system 10 using MMSE demodulation in the case where the precoder for the interfering data stream is orthogonal to the precoder for the desired data stream. It is assumed that 16 QAM modulation is used and that the hypothesized precoders are tested over ten test symbols. FIG. 8 again shows that the SNR at the output of the demodulator is significantly increased when MMSE demodulation is used.

The present invention may, of course, be carried out in other specific ways than those herein set forth without departing from the scope and essential characteristics of the invention. The present embodiments are, therefore, to be considered in all respects as illustrative and not restrictive, and all changes coming within the meaning and equivalency range of the appended claims are intended to be embraced therein.

What is claimed is:

1. A method of demodulating a received signal in a MIMO system, said method comprising:
receiving a signal transmitted from a transmitter having two or more transmit antennas, said received signal containing a desired data stream pre-coded with a known precoder and interference attributable to at least one interfering data stream pre-coded with an unknown precoder;
estimating the precoder for the interfering data stream;
demodulating the desired data stream using the known precoder of the desired data stream and the estimated precoder for the interfering data stream to reduce said interference and to obtain demodulation symbols corresponding to said desired data stream;
wherein estimating the precoder for the interfering data stream comprises testing two or more hypothesized precoders to generate a demodulation performance metric for each hypothesized precoder, and selecting one of the hypothesized precoders as the estimated precoder based on said demodulation performance metrics; and
wherein testing two or more hypothesized precoders to generate a demodulation performance metric for each hypothesized precoder comprises demodulating selected test symbols in the desired data stream using each hypothesized precoder and computing, for each hypothesized precoder, a demodulation performance metric for each hypothesized precoder.

2. The method of claim 1 wherein computing a demodulation performance metric for each hypothesized precoder comprises computing an average interference for the demodulated test symbols corresponding to each hypothesized precoder.

3. The method of claim 2 wherein computing an average interference for the test symbols comprises:
estimating interference for each demodulated test symbol as the difference between a hard value and a soft value computed for the test symbol; and
computing an average interference based on said interference estimates.

4. The method of claim 2 wherein selecting the one of the hypothesized precoders as the estimated precoder based on said performance metrics comprises selecting the hypothesized precoder that results in the lowest average interference.

5. The method of claim 1 wherein computing a demodulation performance metric for each hypothesized precoder comprises computing a signal plus noise metric for the demodulated test symbols corresponding to each hypothesized precoder.

6. The method of claim 5 wherein selecting one of the hypothesized precoders as the estimated precoder based on said performance metrics comprises selecting the hypothesized precoder that results in the lowest signal plus noise metric.

7. The method of claim 1 wherein computing a demodulation performance metric for each hypothesized precoder comprises computing weighted performance metrics to bias selection of the estimated precoder against hypothesized precoders that are the same as the known precoder for the desired data stream.

8. The method of claim 1 wherein computing a demodulation performance metric for each hypothesized precoder further comprises weighting said demodulation performance metrics to bias selection of the estimated precoder to favor hypothesized precoders orthogonal to the known precoder for the desired data stream.

9. The method of claim 1 wherein computing a demodulation performance metric for each hypothesized precoder further comprises weighting said demodulation performance metrics to bias selection of the estimated precoder in a given time or frequency interval to favor hypothesized precoders used for the interfering data stream in a previous time or frequency interval.

10. The method of claim 1 wherein demodulating the desired data stream using the known precoder of the desired data stream and the estimated precoder for the interfering data stream comprises jointly demodulating the desired data stream and the interfering data stream using the known precoder of the desired data stream and the estimated precoder for the interfering data stream.

11. The method of claim 10 wherein jointly demodulating the desired data stream and the interfering data stream comprises demodulating the desired data stream and the interfering data stream in an MMSE demodulator.

12. A receiving terminal comprising:
a receiver to receive a signal transmitted from a transmitter having two or more transmit antennas, said received signal containing a desired data stream pre-coded with a known precoder and interference attributable to at least one interfering data stream pre-coded with an unknown precoder;
a demodulation unit for demodulating the desired data stream, said demodulation unit comprising an estimator to estimate the precoder for the interfering data stream, and a demodulator to demodulate the desired data stream using the known precoder of the desired data stream and the estimated precoder for the interfering data stream to reduce said interference and to obtain demodulation symbols corresponding to said desired data stream;
wherein the estimator is configured to estimate the precoder for the interfering data stream by testing two or more hypothesized precoders to generate a demodulation performance metric for each hypothesized precoder, and selecting one of the hypothesized precoders as the estimated precoder based on said demodulation performance metrics; and
wherein the estimator is configured to test two or more hypothesized precoders to generate a demodulation performance metric for each hypothesized precoder by demodulating selected test symbols in the desired data stream using each hypothesized precoder and computing, for each hypothesized precoder, a demodulation performance metric for each hypothesized precoder.

13. The receiving terminal of claim 12 wherein the estimator is configured to compute a demodulation performance metric for each hypothesized precoder by computing an average interference for the demodulated test symbols corresponding to each hypothesized precoder.

14. The receiving terminal of claim 13 wherein the estimator is configured to compute an average interference for the test symbols by estimating interference for each demodulated test symbol as the difference between a hard value and a soft value computed for the test symbol, and computing an average interference based on said interference estimates.

15. The receiving terminal of claim 13 wherein the estimator is configured to select the hypothesized precoder that results in the lowest average interference as the estimated precoder.

16. The receiving terminal of claim 12 wherein the estimator is configured to compute a demodulation performance metric for each hypothesized precoder comprises computing a signal plus noise metric for the demodulated test symbols corresponding to each hypothesized precoder.

17. The receiving terminal of claim 16 wherein the estimator is configured to select the hypothesized precoder that results in the lowest signal plus noise metric.

18. The receiving terminal of claim 12 wherein the estimator is further configured to compute a demodulation performance metric for each hypothesized precoder by computing weighted performance metrics to bias selection of the estimated precoder against hypothesized precoders that are the same as the known precoder for the desired data stream.

19. The receiving terminal of claim 12 wherein the estimator is further configured to compute a demodulation performance metric for each hypothesized precoder by computing weighted performance metrics to bias selection of the estimated precoder to favor hypothesized precoders orthogonal to the known precoder for the desired data stream.

20. The receiving terminal of claim 12 wherein the estimator is further configured to compute a demodulation performance metric for each hypothesized precoder by computing weighted performance metrics to bias selection of the estimated precoder in a given time or frequency interval to favor hypothesized precoders used for the interfering data stream in a previous time or frequency interval.

21. The receiving terminal of claim 12 wherein the demodulator is configured to jointly demodulating the desired data stream and the interfering data stream using the known precoder of the desired data stream and the estimated precoder for the interfering data stream.

22. The receiving terminal of claim 21 wherein the demodulator comprises an MMSE demodulator.

* * * * *